April 28, 1959     W. M. CAMPBELL     2,884,589
WELL LOGGING RECORDING APPARATUS
Filed May 17, 1954     7 Sheets—Sheet 2

INVENTOR.
William M. Campbell
ATTEST
Lloyd A. Heneveld
BY
Norbert E. Birch
Attorney April 28, 1959     W. M. CAMPBELL     2,884,589
WELL LOGGING RECORDING APPARATUS
Filed May 17, 1954     7 Sheets-Sheet 3

INVENTOR.
William M. Campbell

INVENTOR.
William M. Campbell

April 28, 1959     W. M. CAMPBELL     2,884,589
WELL LOGGING RECORDING APPARATUS
Filed May 17, 1954     7 Sheets-Sheet 5

INVENTOR.
William M. Campbell
BY
Attorney

ATTEST

United States Patent Office 2,884,589
Patented Apr. 28, 1959

2,884,589

WELL LOGGING RECORDING APPARATUS

William M. Campbell, Irving, Tex., assignor to The Atlantic Refining Company, Philadelphia, Pa., a corporation of Pennsylvania Application May 17, 1954, Serial No. 430,330

11 Claims. (Cl. 324—1)

This invention generally relates to well logging apparatus for logging the resistivities of the formations adjacent a borehole. More particularly, this invention is directed toward well logging apparatus having a recording mechanism for recording the presence of a bank of connate water which is formed when a formation containing flowable hydrocarbons is traversed by a borehole drilled with a drilling fluid having a resistivity greater than the connate water.

Electrical well logging is a technique which is well known and which has been used primarily to measure the apparent resistivity of the formation so that some of the properties of the formation can be determined by the resistivity measured. Herebefore well logging instruments have measured the apparent resistivity of areas closely adjacent the borehole where the formation is invaded by the drilling mud and areas at a remote distance from the borehole. It has been discovered, as disclosed in the co-pending application, Serial No. 317,102, entitled "Method and Apparatus for Locating Displaceable Oil in Subterranean Formations," by Ellis W. Shuler, Jr., Henry F. Dunlap, and Lloyd E. Gourley, Jr., now Patent No. 2,782,364, that when a borehole is drilled with a drilling fluid having a high resistivity the drilling fluid displaces displaceable hydrocarbons when an oil reservoir is traversed, and a bank of connate water or "low zone" is formed radially from the borehole.

One purpose of this invention is to provide means whereby an indication of this bank of connate water can be visually detected, and to provide a permanent record chart upon which the apparent resistivities of the formation and the bank of connate water is recorded in such manner as to show the indication of the bank without the necessity of a great deal of interpretation.

Therefore, an object of this invention is to provide well logging apparatus having recording means which will record a profile of the apparent resistivities of increments of a formation spaced radially from the borehole.

A further object of this invention is to provide electrical well logging apparatus with recording means which immediately indicates the presence of the bank of connate water which is formed when a formation containing flowable hydrocarbons is traversed by a borehole drilled with a drilling fluid having a resistivity greater than the connate water.

Another object of this invention is to provide visual presentation means from which the presence of a bank of connate water, referred to above can be readily visualized.

A still further object of this invention is to provide well logging apparatus in which the well logging tool can be raised or lowered and the record recorded by the recording mechanism will not be deleteriously affected thereby but will still indicate the apparent resistivities of radial increments of the formation spaced from the borehole and the depth at which the apparent resistivities are being measured.

My invention can be best understood by referring to the drawings wherein.

Figure 1:
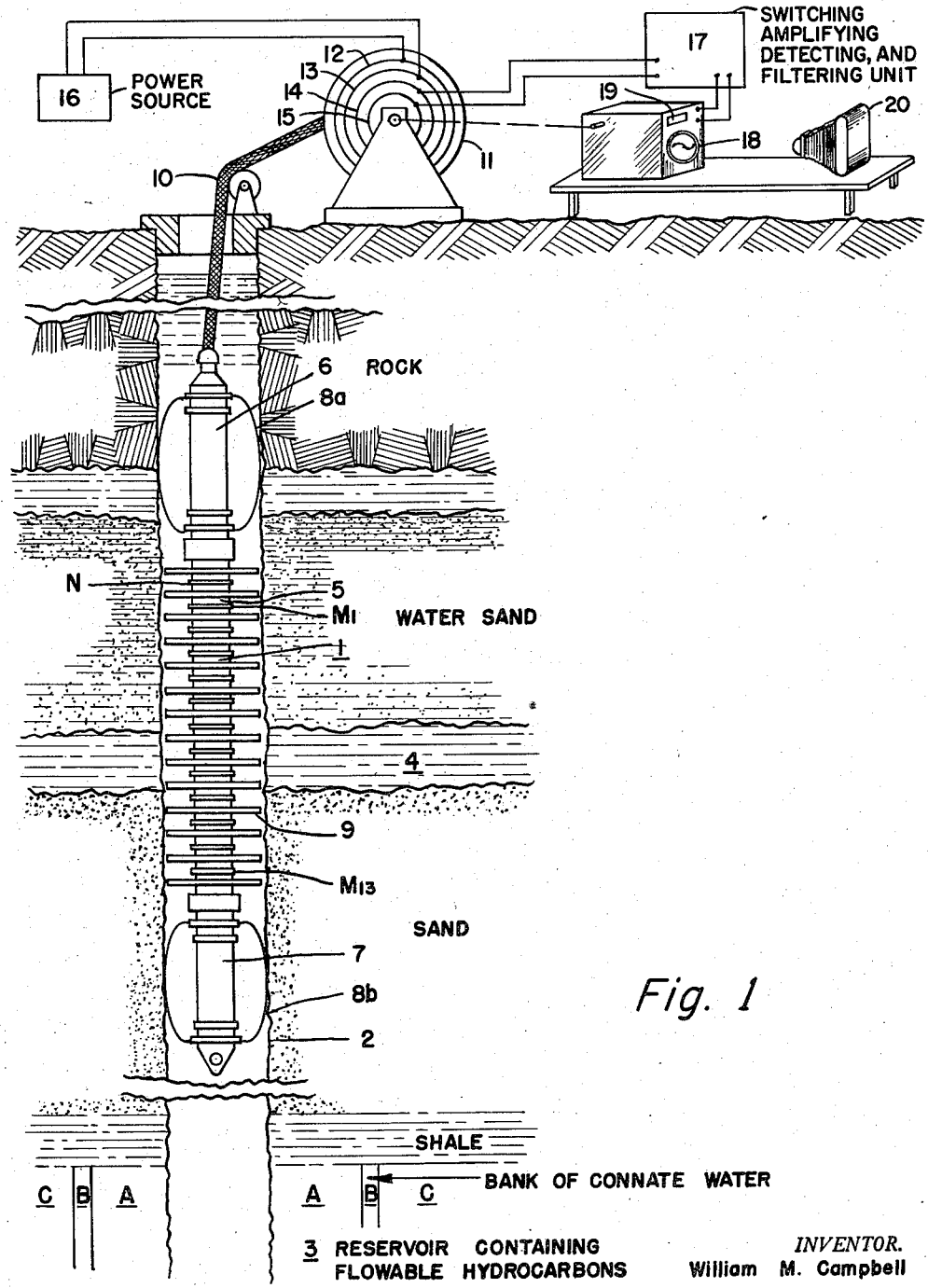
Figure 1 shows diagrammatically my well logging apparatus located in the borehole of a well.

Referring to the drawing in detail and first to the general arrangement shown in Figure 1, it will be seen that well logging instrument 1 is lowered into borehole 2 to measure the apparent resistivities of the formations surrounding the borehole. Borehole 2 is shown as traversing several layers of sand, rock, and the oil reservoir 3 containing flowable hydrocarbons. In reservoir 3 there are shown the three zones which are created by the drilling mud as disclosed in the co-pending application, Serial No. 317,102, referred to previously. Zone A is the invaded zone which comprises drilling fluid and the residual hydrocarbons. Zone B is the bank of connate water, and zone C contains the displaced hydrocarbons and other virgin formation fluids. It is evident that if the drilling fluid has a high resistivity greater than connate water, zones A and C will have resistivities greater than zone B. Thus, if the resistivity of the formation is measured at increments radially from borehole 2 and an indication of zone of low resistivity is consistently recorded, it can usually be determined that a bank of connate water exists radially from the borehole and the formation contain flowable hydrocarbons.

One difficulty which has been encountered in detecting the bank of connate water by such a manner is that layers of shale or a porous streak, such as layer 4 which has a low resistivity will also show up as a zone of low resistivity on the resistivity record. It is therefore very difficult in many cases to distinguish an inflection in the resistivity record caused by such a layer and an inflection in the resistivity record caused by a bank of connate water. Thus, very often one will mistakenly interpret an inflection in the resistivity record as indicating a bank of connate water while such inflection was merely due to a layer of shale, or a porous streak. The well logging apparatus of this invention provides a record which readily distinguishes between these two inflections. In fact, by means of the apparatus of this invention one can detect the presence of a bank of connate water by observing a visual indicator at the site of the logging operation.

Referring to the well instrument 1, as illustrated in Figure 1, there is shown a sonde 5 which has a plurality of potential electrodes $M_1$–$M_{13}$ mounted at spaced intervals and a current electrode N mounted near the top thereof. On the top of instrument 1 is attached housing 6 in which the means for transmitting the signal from the electrodes to the surface of the earth is housed. While this invention is not limited to the use of a single conductor cable it will be shown and described in connection with such cable, therefore housing 6 contains telemetering equipment, not shown, which is adapted to simultaneously transmit to the surface of the earth the potential picked up by electrodes $M_1$–$M_{13}$. Attached to the bottom of the sonde 5 is the extension 7. Located on the housing 6 and extension 7 are centralizing elements 8a and 8b which provide means for centralizing the well instrument in order to prevent bumpers 9 from jamming against the wall of the borehole and also to give the maximum blocking effect. Bumpers 9 block the flow of current in the borehole so that the current flowing in the borehole mud will not mask the effect of the currents in the formation on the potential electrodes.

Connected to the top of housing 6 is cable 10 which is wound on reel 11. Reel 11 raises and lowers the instrument 1 in borehole 2 and has provided thereon a plurality of slip rings 12, 13, 14, and 15. Slip rings 12 and 13 are electrically connected to the source of current 16 and to the single conductor cable 10 which is connected to current electrode N and telemetering means located in housing 6. Slip rings 14 and 15 are electrically connected to the unit 17 which comprises switching, amplifier, detecting and filtering means as will be more fully disclosed hereinafter. Slip rings 14 and 15 are also electrically connected to the single conductor cable 10 through which the signals from the well instrument are transmitted. Accordingly, the signals picked up by the potential electrodes $M_1$–$M_{13}$ are transmitted through cable 10 to slip rings 14 and 15 and sequentially impressed on the vertical plates of oscilloscope 18 by means of the instrumentation of unit 17. Depth indicator 19 mounted adjacent or on oscilloscope 18 is operatively connected to reel 11 so that the depth of the instrument 1 for any given reading of oscilloscope 18 is indicated thereon. Indicator 19 is adapted to show the depth of the sonde regardless of whether the sonde 5 is being raised or lowered. Camera 20 photographs the readings on oscilloscope 18 and indicator 19 at intermittent intervals to give a permanent record of the apparent resistivities measured by instrument 1 at various depths of borehole 2.

Figure 2:
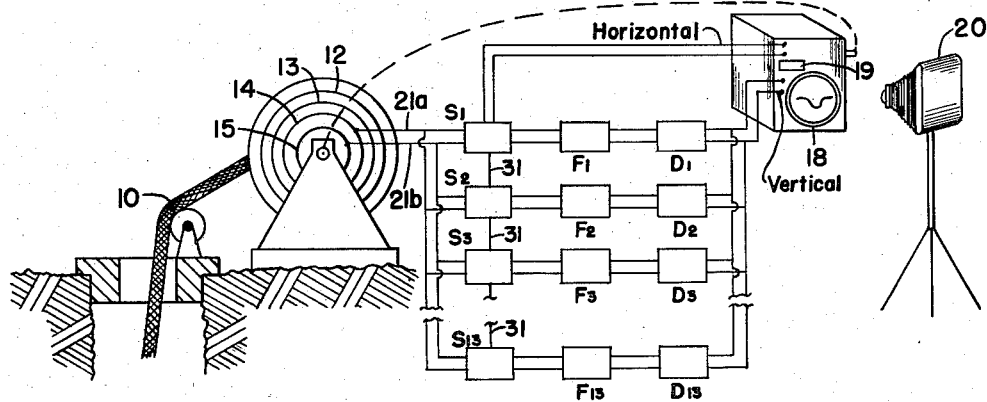
Figures 2 and 3 illustrate one embodiment of my recording mechanism.
Figure 3:
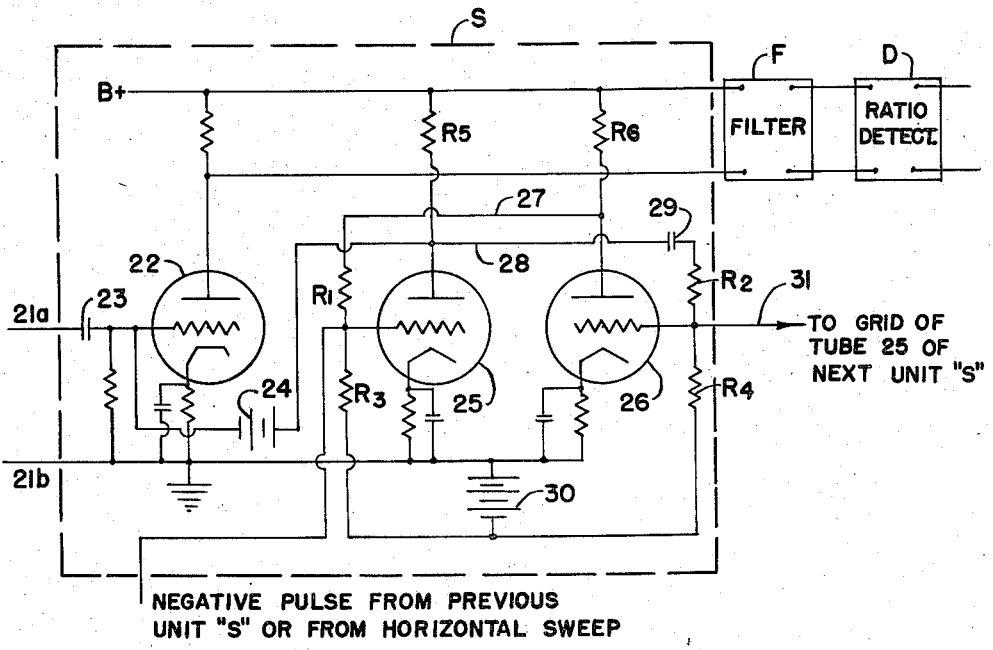

Referring to Figures 2 and 3, there is disclosed in more detail one means of transmitting the signals to the surface of the earth and recording them on a record chart in the manner previously set forth. In accordance with this embodiment the changes in potentials caused by different resistivities are picked up by the potential electrodes $M_1$–$M_{13}$ and converted to corresponding changes in apparent resistivities in any well known manner and thereafter simultaneously transmitted through cable 10 to the slip rings 14 and 15 by means of a frequency modulated carrier current. Any conventional frequency modulated system can be used in transmitting the signals up to slip rings 14 and 15. Briefly, in such a system the signals representing the change in resistivities of radial increments of the formations are employed to modulate the frequencies of carrier waves. At the surface of the earth the carrier waves are demodulated and each of the demodulated signals representing the apparent resistitvity of an increment of the formation spaced at a radial depth from the borehole are displayed upon the vertical plates of the oscilloscope 18 in an orderly sequence to thereby present on the oscilloscope 18 a profile of the apparent resistivities of the increments of the formation spaced radially from the borehole at the particular depth where the well instrument is located. This is accomplished by means of electronic switching units $S_1$–$S_{13}$, filter units $F_1$–$F_{13}$, and ratio detector units $D_1$–$D_{13}$. Each unit $S_1$–$S_{13}$ is adapted to intermittently and sequentially pass all the carrier frequencies from well instrument 1 to its respective filter $F_1$–$F_{13}$. Each of the filters $F_1$–$F_{13}$ passes one of the frequencies carrying the signal to the ratio detector which is coupled to the vertical plates of the oscilloscope. Consequently, the signals transmitted through cable 10 are momentarily and sequentially impressed in a definite order upon the oscilloscope from left to right to give a profile of the apparent resistivities of radial increments of the formation spaced from the borehole.

A detailed circuit diagram for each of the electronic switching units $S_1$–$S_{13}$ is shown in Figure 3. Conductors 21a and 21b leading from the slip rings 14 and 15 carry the frequency modulated signal which is transmitted from the well instrument through the cable 10. The signal is capacitively coupled to the grid of amplifier tube 22 by means of capacitance 23. The bias power supply 24 for tube 22 ordinarily biases tube 22 beyond cutoff, thereby preventing it from conducting and preventing the signal from cable 10 from being amplified and fed to filter F, detector D, and oscilloscope 18. Coupled to control grid of tube 22 through battery 24 is a pair of electronic tubes 25 and 26 which are designed so that only one of the tubes can conduct at any one time. The grid of tube 25 is connected to the plate of tube 26 by means of the conductor 27 which has a resistance $R_1$. The grid of tube 26 is connected to the plate of tube 25 by means of conductor 28 and condenser 29 and resistance $R_2$ connected in series. Each of the grids of tubes 25 and 26 are negatively biased by means of the power source 30 through resistances $R_3$ and $R_4$, respectively.

The operation of the electronic switching unit is as follows. The condenser 29 which is located between the B+ and the grid of tube 26 initially prevents tube 26 from conducting by preventing the B+ from making the grid of tube 26 positive enough to permit tube 26 to conduct. Tube 25 will normally conduct since current is permitted to flow through $R_6$ and $R_1$, thus permitting B+ to raise the bias on the grid tube 25. When tube 25 is conducting the drop in potential across $R_5$ in the plate circuit is made sufficiently high to prevent B+ from raising the bias on the grids of tubes 22 and 26, thus preventing tubes 22 and 26 from conducting. However, when tube 25 does not conduct, the B+ raises the grid bias on tube 22 and permits it to conduct. Tube 26 will conduct momentarily when tube 25 stops conducting, due to the charging of condenser 29 through resistors $R_2$ and $R_4$. When tube 22 conducts, the modulated signals from the conductors 21a and 21b are amplified by tube 22 and carried to filter $F_1$ where a selected signal within a particular frequency range is passed to the ratio detector $D_1$ thence to the vertical plates of oscilloscope 18. Since tube 22 can only conduct when tube 25 does not conduct the tube 26 is conducting, a means is provided for intermittently causing tube 26 to conduct and tube 25 to not conduct. This is accomplished by impressing on the grid of tube 25 a negative pulse which is carried from the previous electronic switching unit S or a negative pulse formed from the sawtooth signal conventionally employed to drive the horizontal sweep of the oscilloscope, depending on which switching unit is in operation. When the negative pulse is impressed upon the grid of tube 25 the tube is biased beyond cut-off and will no longer conduct, therefore the current through the resistance $R_5$ is reduced permitting tubes 22 and 26 to conduct. During the conducting of tube 26 while condenser 29 is charging up the current through $R_6$ is sufficient so that there is a great potential drop across $R_6$ which creates a continuing low bias on the grid of tube 25 thereby preventing tube 25 from conducting while tube 26 is conducting. When tube 26 stops conducting due to the charging up of condenser 29 positive potential from B+ is impressed on the grid of tube 25 and tube 25 again starts to conduct thereby preventing tube 26 and tube 22 from conducting. When tube 26 stops conducting and tube 25 starts conducting again condenser 29 discharges and sends a negative pulse through conductor 31 to the grid of the next electronic switching unit and in the next unit the above entire procedure takes place.

All the electronic switching units $S_1$–$S_{13}$ operate in the same manner described above. Therefore, the sequence of events in the operation of the apparatus of Figures 2 and 3 is as follows: When the horizontal sweep of the oscilloscope is driven from left to right a negative pulse produced thereby is capacitively coupled onto the grid of tube 25 of unit $S_1$. Tube 25 stops conducting and tube 26 starts conducting, at which time all the modulated signals which are transmitted from the cable 10 are amplified and fed to the filter $F_1$ and detector $D_1$. Filter $F_1$ blocks all the signals but one signal within a certain frequency range which signal represents the apparent resistivity detected by the potential electrode $M_1$ and it is passed to the detector $D_1$ where it is demodulated and thereafter displayed as a vertical deflection on the oscilloscope beam immediately after the beam starts its sweep from left to right. When tube 26 of unit 1 is cut off and tube 22 becomes biased beyond cut-off as explained previously a negative pulse is fed from the grid of tube 26 of unit $S_1$ to the grid of tube 25 of unit $S_2$. Tube 25 of unit $S_2$ is cut off and tube 22 of unit $S_2$ is operative and modulated signals representing the apparent resistivity signal from potential electrode $M_2$ are amplified and fed to the filter $F_2$, ratio detector $D_2$, and the vertical plates of oscilloscope 18 in the manner previously described. In a like manner the electronic switching units $S_3$ through $S_{13}$ are operated and the signals are displayed in order on the oscilloscope 18. After the last signal from the switching unit $S_{13}$ is displayed on oscilloscope 18, the electronic switch unit $S_1$ is again operated and the sequential operation of all the units is repeated.

The apparatus of Figures 1, 2, and 3 provides a record from which one can easily distinguish between inflections in the resistivity curve which indicate a horizontal layer in the formation and inflections caused by the presence of a radial bank of connate water. This can be more readily understood by referring to Figure 4 wherein is shown a chart produced by the apparatus of Figure 1.

Figure 4:
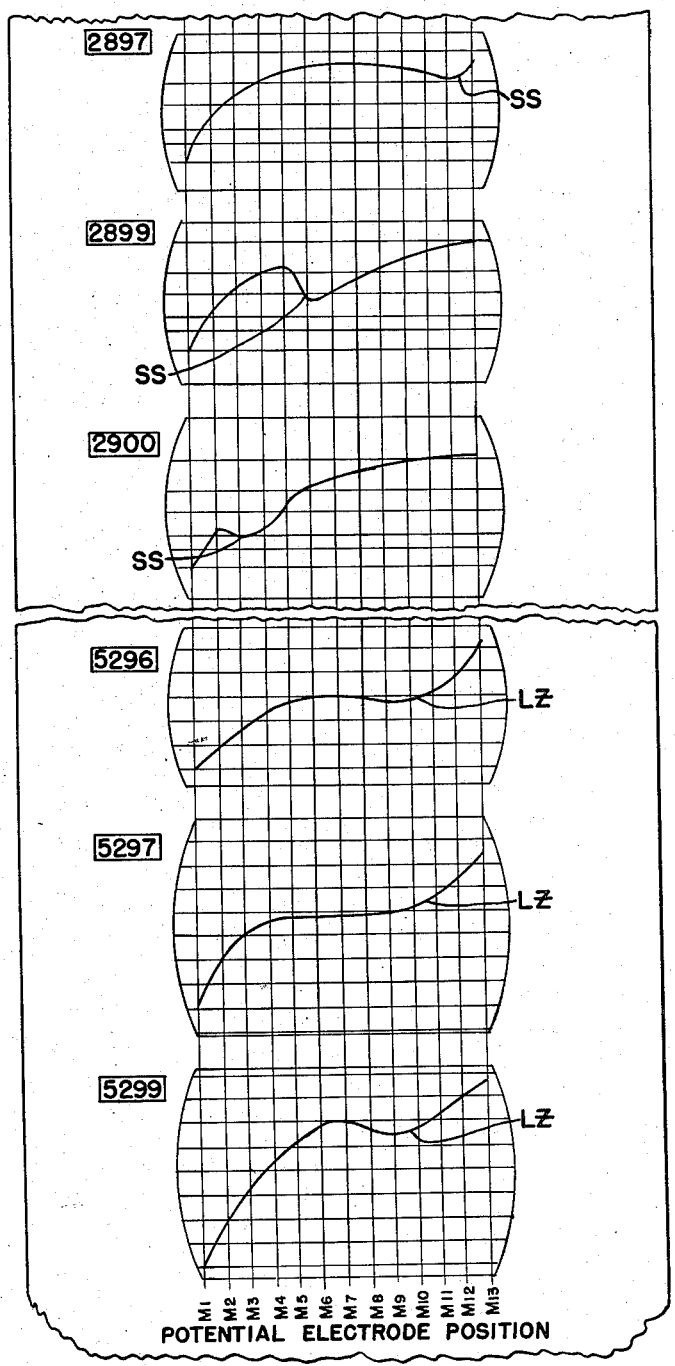
Figure 4 shows the record which is produced by the recording mechanism of Figures 2 and 3.

Figure 4 shows a chart upon which has been photographed the resistivity curves indicated on oscilloscope 18 and depth indicator 19. The potential electrode positions are shown to vary across the chart and accordingly indicate increasing depth of investigation into the formation radially from the borehole. On the upper part of the chart there is shown a profile of the resistivities picked up by the electrodes $M_1$–$M_{13}$ as they pass the shale streak 4 which has a low resistivity. At 2,897 feet, the apparent resistivities measured by the potential electrodes $M_{11}$–$M_{13}$ show a dip SS which indicates the presence of a shale streak or another low resistivity streak, however, one could never be certain that the dip was caused by a shale streak since the potential electrodes $M_{11}$–$M_{13}$ might be indicating the presence of a bank of connate water which is formed when the borehole traverses a formation containing flowable hydrocarbons. On observing the signal picked up by the potential electrodes at 2,899 feet and 2,900 feet, it becomes apparent that the dip SS was caused by a layer of shale or porous streak since the dip occurs between the potential electrodes $M_5$–$M_8$ at 2,899 feet and occurs between potential electrodes $M_2$ and $M_5$ at 2,900 feet. It therefore can be definitely determined that the well instrument 1 passed a layer of shale or another streak of low resistivity because the low resistivity streak was picked up by different potential electrodes as they passed by the streak.

At the lower section of the chart of Figure 4, which corresponds to the position of the instrument as it progressed downwardly into the borehole 2 and traversed the formation 3 which contained flowable hydrocarbons, a dip LZ is indicated between the potential electrodes $M_7$ and $M_{12}$ at 5,296 feet. Considering the dip at 5,296 feet by itself, it is not apparent whether the dip LZ is caused by a bank of connate water or by the presence of a layer of shale. However, it becomes apparent as the tool progressed down the hole to 5,297 and 5,299 feet that the dip is not a shale streak because dip LZ is still present on the chart between the potential electrodes $M_7$ and $M_{12}$. It can then definitely be determined that the dip LZ indicates the presence of a bank of connate water or "low zone" and therefore indicates that the formation 3 contains flowable hydrocarbons.

It should be evident from the above description that with the apparatus of this invention, while the logging apparatus is being operated, one can visually observe on the oscilloscope the presence of a bank of connate water. In fact, one can distinguish dips in the profile of the resistivities of the formation caused by streaks of shale etc. by observing whether the dip progresses across the chart. In many cases it is advisable to raise and lower the sonde 5 in formations that appear to be interesting to check on the dips that are observed. This invention provides an apparatus with which this can be accomplished. Meanwhile, the camera records all this information along with the depth which is shown on the depth indicator 19.

Figure 5:
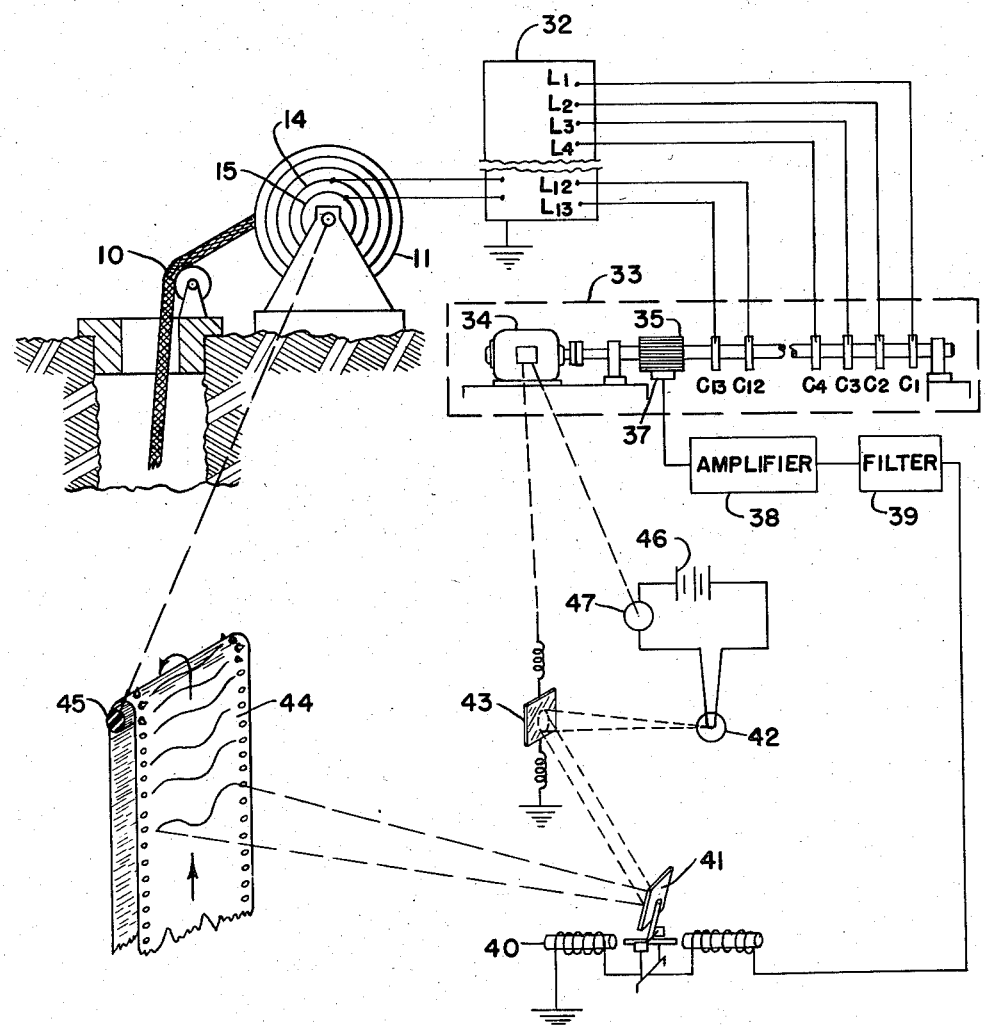
Figures 5 and 6 show another embodiment of my recording mechanism.
Figure 6:
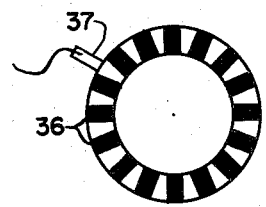
Figure 7:
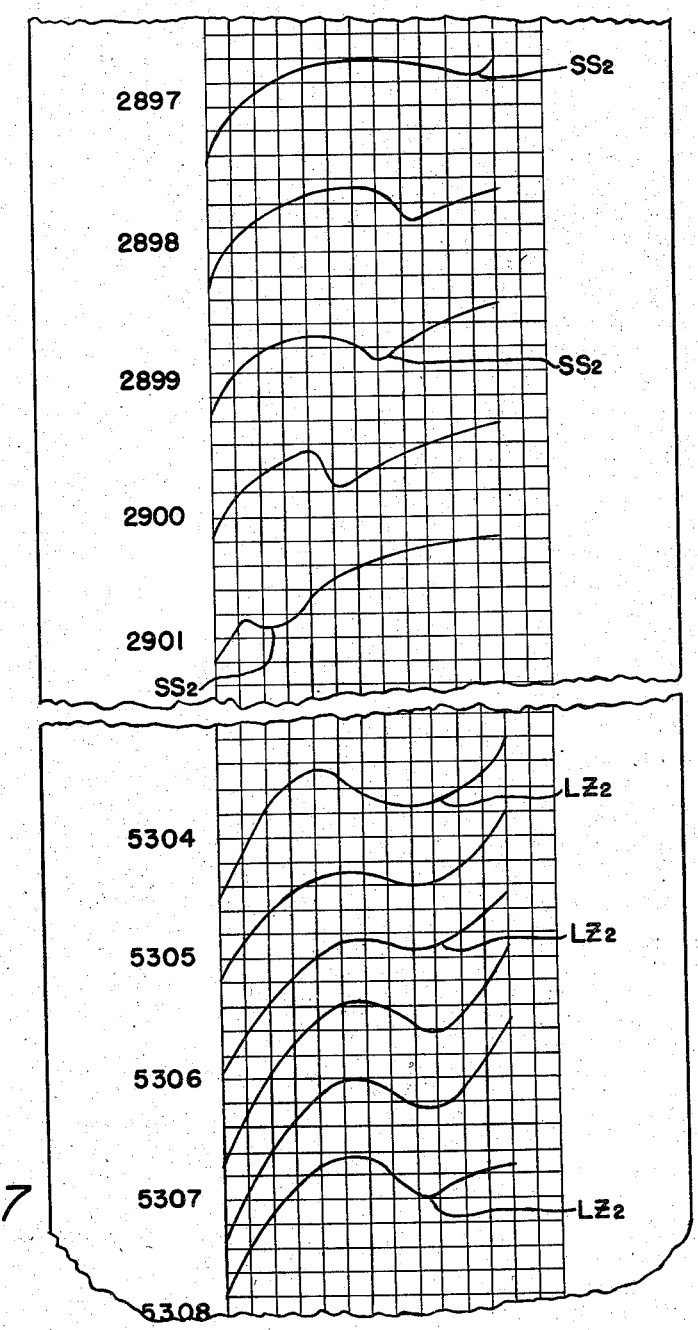
Figure 7 shows the record produced by the embodiment of my recording mechanism shown in Figure 5.

Another modification of this invention is shown in Figures 5 and 6 wherein is shown an apparatus where the signals can be separated and sequentially impressed on a recording mechanism by mechanical means. Figure 7 shows reel 11 upon which cable 10 is wound and which has slip rings 14 and 15 mounted thereon the same as is shown in Figures 1 through 3. In this embodiment the modulated signal from slip rings 14 and 15 is fed to a filter unit 32 and the various signals are separated therein and passed to a mechanical separator 33. Separator 33 comprises a synchronous motor 34 which actuates a commutator 35 and a plurality of slip rings $C_1$ through $C_{13}$. Commutator 35, as shown in Figure 6 has a plurality of commutator segments 36 thereon, each of which is electrically connected to one of the slip rings $C_1$–$C_{13}$, by any well known means not shown. The brush 37 which is made of high resistive carbon picks off the signals from the commutator segments as the motor 34 revolves the commutator. The signal picked up by the brush 37 is fed through the amplifier 38 and filter 39 to a galvanometer 40 which controls the reflecting unit 41. The recording mechanism is this embodiment comprises a beam of light which is emanated from the light source 42 and is reflected on a horizontal reflector 43 and the vertical reflector 41. This beam of light is projected on the photographic paper 44 which is continuously moved by means of spool 45 mechanically coupled to reel 11 so that it is rotated in synchronism with reel 11. The speed of rotation of spool 45 can be the same as spool 11 or it can be any multiple thereof, the only limitation being that the number of feet printed on the chart corresponds with the depth of the sonde. Light source 42 has a source of potential 46 and switch 47. Switch 47 is operated intermittently in sequence with the synchronous motor 34 and in this example is arranged to close one out of every four revolutions of the commutator 35 thus providing a time lag between recordings so that the resistivity profiles are spaced on the chart. Switch 47 can be made to close upon any multiple of revolutions of the commutator 35, depending upon the desired spacing between the resistivity profiles. In the operation of the apparatus, when the beam of light is emanated from the light source 42 it is reflected off horizontal reflector 43 and vertical reflector 41 and projected on the chart 44. Horizontal reflector 43 reciprocates in synchronism with the rotation of the commutator 35 so that the beam of light emanating from source 42 will be swept across the chart 44 once every four revolutions of the commutator 35. Each sweep starts when the signal from commutator $C_1$ carrying the signal from $M_1$ is impressed on the galvanometer 40 and ends after one complete revolution of the commutator. Thereafter the signals from $M_2$, $M_3$, $M_3$, etc. will sequentially deflect the beam of light as it moves across paper 44.

A record which was recorded by the recording apparatus of Figures 5 and 6 is shown in Figure 7. In this case the chart is continuously moved, however, the source of current 42 is intermittently interrupted as previously described so that the chart can move through a portion thereof after each recording to give more distinct and separate resistivity curves at various depths. In Figure 7 is shown the chart which has marked thereon the depths at which the resistivity readings are being observed. It is evident from dips SS$_2$ and LZ$_2$ that many of the same advantages are obtained from the recording mechanism shown in Figures 5 and 6 as was obtained in the recording mechanism shown in Figures 1 through 3, except that the sonde 5 cannot be lowered and raised without interfering with the record already obtained.

Figure 8:
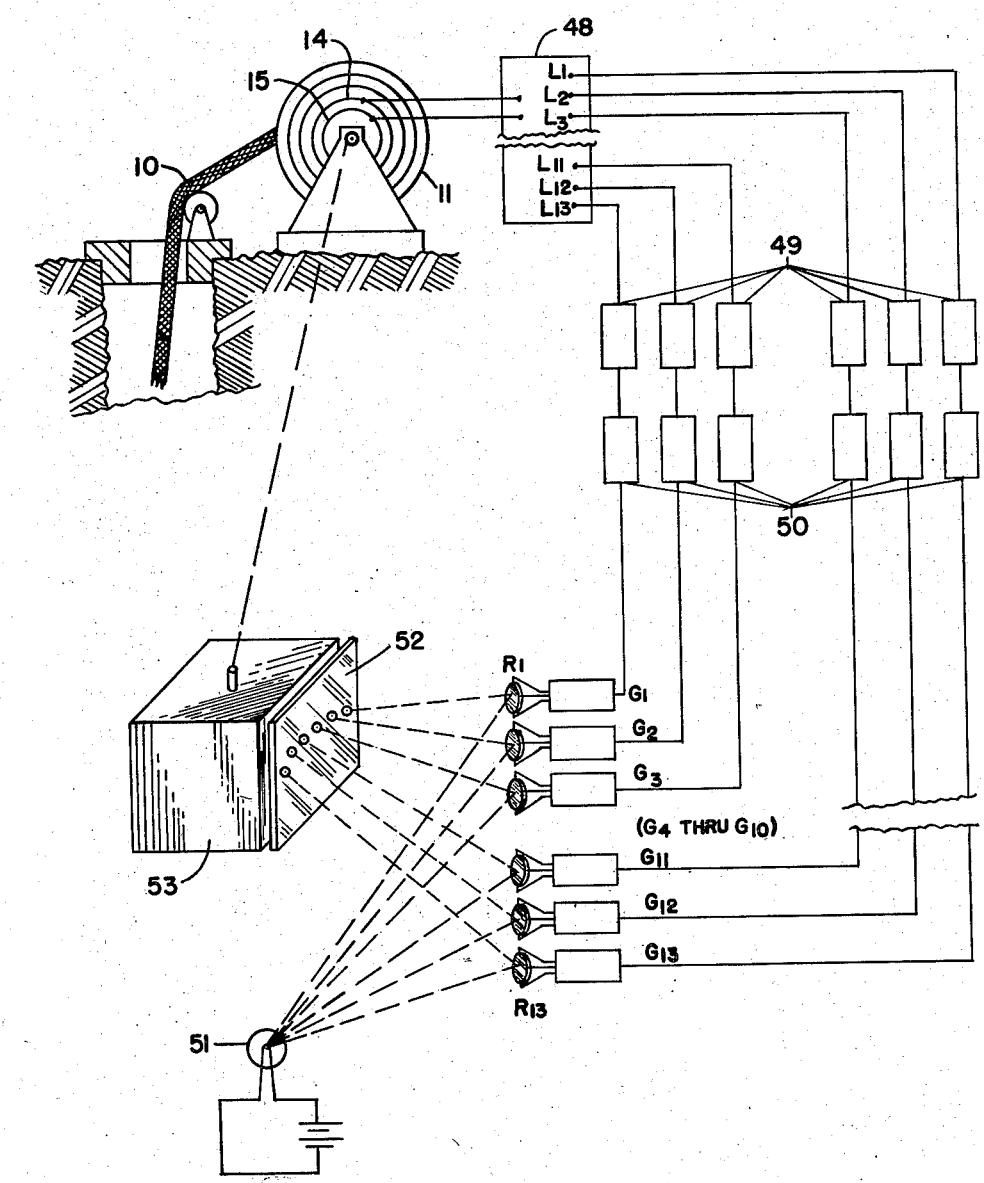
Figure 8 shows a third embodiment of my recording mechanism.

Another embodiment of this invention is shown in Figure 8 wherein is illustrated another method for recording a profile of the resistivity of a formation at a particular depth. Similar to Figures 1 through 3, Figure 8 shows a cable 10 wound on reel 11 which has slip rings 14 and 15. The frequency modulated signal which is transmitted through cable 10 is fed to the filter 48 where the signals are separated and fed to the amplifiers 49 and filters 50. Each of the signals are simultaneously fed to the galvanometers G$_1$ through G$_{13}$, which control the position of reflectors R$_1$ through R$_{13}$. The light source 51 (or a plurality of light sources) shines on each of the reflectors R$_1$ through R$_{13}$ and the position of the reflector is indicated on the frosted glass 52. Since the position of the reflectors is dependent upon the signal received from the cable 10 the spot of light which is shown on the frosted glass indicates the apparent resistivities of increments of the formation and thus a profile of the resistivities of said increments at a given depth is shown on the frosted glass 52 and can be observed by an operator.

A camera unit 53 is provided behind the frosted glass 52, and intermittently a picture is taken of the light spots on glass 52 which indicates the positions of the reflectors R$_1$ to R$_{13}$. The picture obtained gives a permanent record of the resistivity profiles of the formations traversed by the logging instrument. Camera unit 53 includes a depth indicator which is operatively connected to reel 11. This depth indicator, not shown, can be of any conventional type and can be located in the camera in any manner so that a picture is taken of the reading of the indicator.

Figure 9:
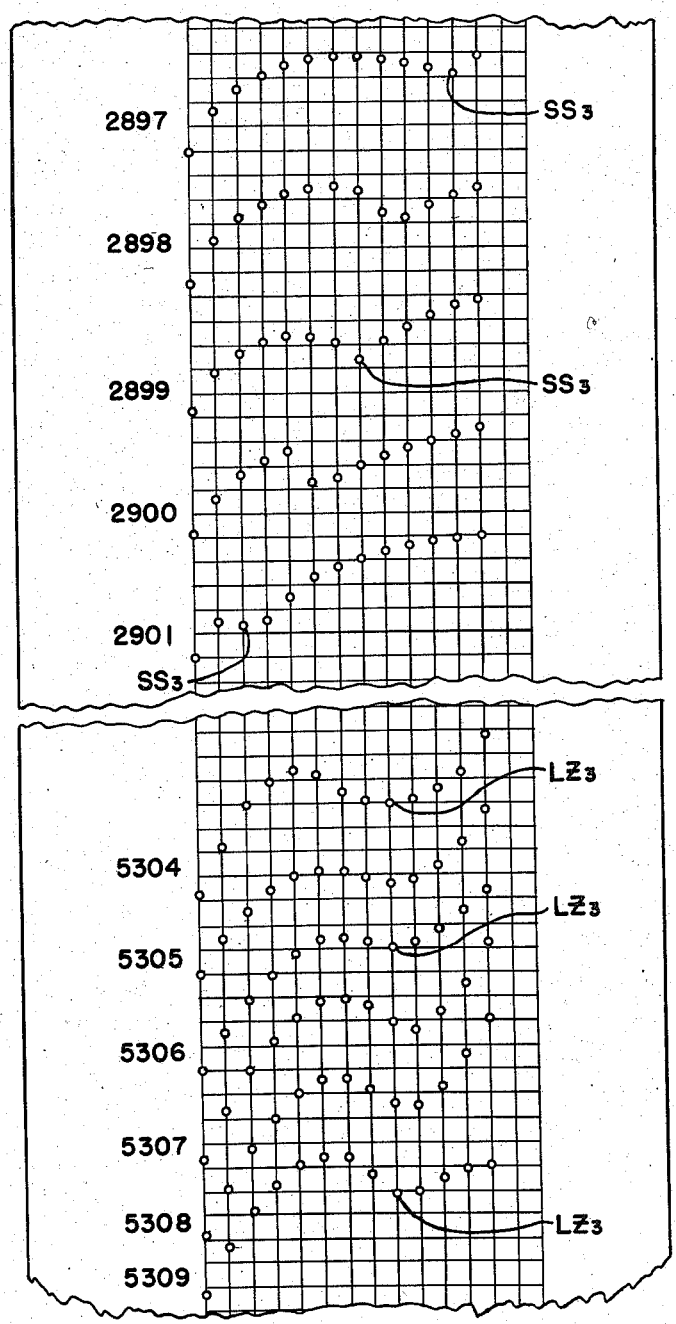
Figure 9 shows the record produced by the embodiment of my invention illustrated in Figure 8.

A record which is obtained by the apparatus of Figure 8 is shown in Figure 9. In this embodiment a picture is taken of the plurality of light spots which are shown on the frosted glass and the reading of the depth indicator. The record as evidenced by dips SS$_3$ and LZ$_3$ is very similar to that shown in Figure 4 and it is evident therefrom that all the advantages previously set forth relative to Figures 1 through 3 are obtained from the use of the apparatus shown in Figure 8.

It is apparent from the above disclosure that the apparatus of this invention provides means whereby a visual presentation and a permanent record of the resistivity profiles of the formations traversed by a borehole can be obtained. It is also evident that by means of such visual presentation and record one can immediately ascertain the presence or non-presence of flowable hydrocarbons in such formation without the necessity of a great deal of burdensome and time-consuming interpretation which would be necessary in the use of present day recording apparatus. By means of this invention one can also distinguish inflections caused by shale and different resistivity layers.

While the above describes and shows the preferred embodiment to be used in this invention, such description of the various instruments is explanatory thereof only and various changes in size, shape, materials and arrangements may be made without departing from the scope of this invention. It should be understood that this invention should not be limited to the measuring of formation resistivities with the use of electrode methods, such as normals, laterals, or differential laterals even though this invention has been described with the use of normals. This invention can be used just as well with induction methods of electrical logging or with the use of laterals or differential laterals. Further, it should be understood that this invention shall only be limited as defined in the appended claims.

What is claimed is:

1. In apparatus for electrically logging subsurface earth formations surrounding a borehole, at a plurality of vertically spaced locations in said borehole, comprising an electrical logging instrument having means for detecting an electrical parameter in each of a plurality of radially spaced increments of said formations, means for converting said detected parameter to a plurality of electrical signals corresponding in number to the number of said increments in which said parameter is detected, and means for transmitting to the surface of the earth said plurality of signals, the combination with said logging instrument of an improved recording means comprising an elongated recording medium, registering means for producing an amplitude-varying, visible trace on said recording medium, first translating means for varying the position of said registering means, between a predetermined maximum and a predetermined minimum spaced along the length of said recording medium, in accordance with a function of the amplitudes of said signals, second translating means for varying the position of said registering means along the width of said recording medium in accordance with a function of the radial distance from said borehole of each of said increments from which said signals originated, means for moving said recording medium parallel to its length as a function of changes in the location of said electrical logging instrument in said borehole and means for shifting said registering means to the opposite side of said recording medium following the recordation of the first series of said plurality of signals obtained at one location in said borehole but before the recordation of the next series of said plurality of signals obtained at a different location in said borehole so as to produce a plurality of individual traces, corresponding in number to the number of said locations in said borehole, spaced one below the other along the length of said recording medium.

2. In apparatus for electrically logging subsurface earth formations surrounding a borehole, at a plurality of vertically spaced locations in said borehole, comprising an electrical logging instrument having means for detecting an electrical parameter in each of a plurality of radially spaced increments of said formations, means for converting said detected parameter to a plurality of electrical signals corresponding in number to the number of said increments in which said parameter is detected, and means for transmitting to the surface of the earth said plurality of signals, the combination with said logging instrument of an improved recording means comprising an elongated recording medium, first registering means for producing an amplitude-varying, visible trace on said recording medium, first translating means for varying the position of said first registering means, between a predetermined maximum and a predetermined minimum spaced along the length of said recording medium, in accordance with a function of the amplitudes of said signals, second translating means for varying the position of said first registering means along the width of said recording medium in accordance with a function of the radial distance from said borehole of each of said increments from which said signals originated, second registering means for recording, adjacent said trace, a numerical indication of the location of said electrical logging instrument in said borehole and means for shifting said registering means to the opposite side of said recording medium following the recordation of the first series of said plurality of signals obtained at one location in said borehole but before the recordation of the next series of said plurality of signals obtained at a different location in said borehole so as to produce a plurality of individual traces, corresponding in number to the number of said locations in said borehole spaced one below the other along the length of said recording medium.

3. In apparatus for electrically logging subsurface earth formations surrounding a borehole, at a plurality of vertically spaced locations in said borehole, comprising an electrical logging instrument having means for detecting an electrical parameter in each of a plurality of radially spaced increments of said formations, means for converting said detected parameter to a plurality of electrical signals corresponding in number to the number of said increments in which said parameter is detected, and means for transmitting to the surface of the earth said plurality of signals, the combination with said logging instrument of an improved recording means comprising visual presentation means, indicating means for producing a visual image on said visual presentation means, first translating means for varying the position of said visual image along a first dimension of the plane of said visual presentation means, between a predetermined maximum and a predetermined minimum spaced along said first dimension of said presentation means, in accordance with a function of the amplitudes of said signals, second translating means for varying the position of said visual image along a second dimension of the plane of said visual presentation means in accordance with a function of the radial distance from said borehole of each of said increments from which said signals originated, an elongated, photographic recording medium, means for moving said recording medium parallel to its length as a function of changes in the location of said electrical logging instrument in said borehole, photographing means for exposing said recording medium to said visual image with said first dimension of said visual presentation means parallel to the length of said recording medium, means for discontinuing said exposure following the recordation of the first series of said plurality of signals obtained at one location in said borehole and resuming said exposure before the recordation of the next series of said plurality of signals obtained at a different location in said borehole so as to produce a plurality of individual traces, corresponding in number to the number of said locations in said borehole, spaced one below the other along the length of said recording medium.

4. In apparatus for electrically logging subsurface earth formations surounding a borehole, at a plurality of vertically spaced locations in said borehole, comprising an electrical logging instrument having means for detecting an electrical parameter in each of a plurality of radially spaced increments of said formations, means for converting said detected parameter to a plurality of electrical signals corresponding in number to the number of said increments in which said parameter is detected, and means for transmitting to the surface of the earth said plurality of signals, the combination with said logging instrument of an improved recording means comprising visual presentation means, first indicating means for producing a visual image on said visual presentation means, first translating means for varying the position of said visual image along a first dimension of the plane of said visual presentation means, between a predetermined maximum and a predetermined minimum spaced along said first dimension of said presentation means, in accordance with a function of the amplitudes of said signals, second translating means for varying the position of said visual image along a second dimension of the plane of said visual presentation means in accordance with a function of the radial distance from said borehole of each of said increments from which said signals originated, second indicating means for displaying, adjacent said visual presentation means, a numerical value indicative of the depth in said borehole at which said individual indications were obtained, an elongated, photographic recording medium, photographing means for exposing said recording medium to said numerical display and said visual image with said first dimension of said visual presentation means parallel to the length of said recording medium, means for discontinuing said exposure following the recordation of the first series of said plurality of signals obtained at one location in said borehole and resuming said exposure before the recordation of the next series of said plurality of signals obtained at a different location in said borehole so as to produce a plurality of individual traces, corresponding in number to the number of said locations in said borehole, spaced one below the other along the length of said recording medium.

5. In apparatus for electrically logging subsurface earth formations surrounding a borehole, at a plurality of vertically spaced locations in said borehole, comprising an electrical logging instrument having means for detecting an electrical parameter in each of a plurality of radially spaced increments of said formations, means for converting said detected parameter to a plurality of electrical signals corresponding in number to the number of said increments in which said parameter is detected, and means for transmitting to the surface of the earth said plurality of signals, the combination with said logging instrument of an improved recording means comprising an oscilloscope, first translating means for impressing said signals upon said oscilloscope in a manner such that the beam of said oscilloscope is deflected vertically as a function of the amplitude of said signals, second translating means for impressing said signals upon said oscilloscope in a manner such that the beam of said oscilloscope is deflected horizontally in accordance with a function of the radial distance from said borehole of each of said increments from which said signals originated, an elongated photographic recording medium, means for moving said recording medium parallel to its length as a function of changes in the location of said electrical logging instrument in said borehole, photographing means for exposing said recording medium to the image on the face of said oscilloscope with the vertical plane of the face of said oscilloscope parallel to the length of said recording medium, means for discontinuing said exposure following the recordation of the first series of said plurality of signals obtained at one location in said borehole and resuming said exposure before the recordation of the next series of said plurality of signals obtained at a different location in said borehole so as to produce a plurality of individual traces, corresponding in number to the number of said location in said borehole, spaced one below the other along the length of said recording medium.

6. In apparatus for electrically logging subsurface earth formations surrounding a borehole, at a plurality of vertically spaced locations in said borehole, comprising an electrical logging instrument having means for detecting an electrical parameter in each of a plurality of radially spaced increments of said formations, means for converting said detected parameter to a plurality of electrical signals corresponding in number to the number of said increments in which said parameter is detected, and means for transmitting to the surface of the earth said plurality of signals, the combination with said logging instrument of an improved recording means comprising an oscilloscope, first translating means for impressing said signals upon said oscilloscope in a manner such that the beam of said oscilloscope is deflected vertically as a function of the amplitude of said signals, second translating means for impressing said signals upon said oscilloscope in a manner such that the beam of said oscilloscope is deflected horizontally in accordance with the function of the radial distance from said borehole of each of said increments from which said signals originated, means for displaying adjacent the face of said oscilloscope a numerical value indicative of the depth in said borehole at which said individual indications were obtained, an elongated, photographic recording medium, photographing means for exposing said recording medium to said numerical display and said visual image with said first dimension of said visual presentation means parallel to the length of said recording medium, means for discontinuing said exposure following the recordation of the first series of said plurality of signals obtained at one location in said borehole and resuming said exposure before the recordation of the next series of said plurality of signals obtained at a different location in said borehole so as to produce a plurality of individual traces, corresponding in number to the number of said locations in said borehole, spaced one below the other along the length of said recording medium.

7. In apparatus for electrically logging subsurface earth formations surrounding a borehole, at a plurality of vertically spaced locations in said borehole, comprising an electrical logging instrument having means for detecting an electrical parameter in each of a plurality of radially spaced increments of said formations, means for converting said detected parameter to a plurality of electrical signals corresponding in number to the number of said increments in which said parameter is detected, and means for transmitting to the surface of the earth said plurality of signals, the combination with said logging instrument of an improved recording means comprising a translucent glass, a source of light for projecting a beam of light, a plurality of adjustable reflection means equal in number to the number of said signals and adapted to reflect an image of said beam of light on said translucent glass at spaced points along a first dimension of the plane of said translucent glass, said spaced points being a function of the radial distance from said borehole of each of said increments from which said signals originated, translating means for adjusting the angle of reflection of each of said reflection means in response to the amplitude of each of said signals in a manner such that the position of said image on said translucent glass varies along a second dimension of said translucent glass in accordance with the amplitude of said signal, an elongated photographic recording medium, means for moving said recording medium parallel to its length as a function of the changes in the location of said electrical logging instrument in said borehole, photographing means for exposing said recording medium to said image with said second dimension of said translucent glass parallel to the length of said recording medium, means for discontinuing said exposure following the recordation of the first series of said plurality of signals obtained at one location in said borehole and resuming said exposure before the recordation of the next series of said plurality of signals obtained at a different location in said borehole so as to produce a plurality of point-graphs, corresponding in number to the number of said locations in said borehole, spaced one below the other along the length of said recording medium.

8. In a method for electrically logging a borehole containing a conductive fluid capable of filtering into earth formations surrounding said borehole wherein an electrical parameter is detected in at least one radially spaced increment of each of three zones of said formations laterally displaced one from the other and displaced outwardly from the wall of said borehole, including a first zone containing that portion of said conductive fluid which has filtered into said formations from said borehole, a second zone containing naturally occurring formation fluids in substantially their virgin state and a third zone intermediate said first and second zones, the improved method of recording said detected values of said parameter comprising a plotting an amplitude-varying, visible trace of said detected values, wherein the ordinate of said trace represents a function of the magnitude of said detected values and the abscissa of said trace represents a function of the lateral distance from the borehole at which each of said detected values were obtained, marking adjacent said trace an indication of the depth in said borehole at which said detected values were obtained and plotting below the first said trace at least one additional trace, of the same character as the first said trace, obtained from a different depth in said borehole to produce a plurality of traces having like values of the abscissas thereof vertically aligned from trace to trace.

9. In a method for electrically logging a borehole containing a conductive fluid capable of filtering into earth formations surrounding said borehole wherein an electrical parameter is detected in at least one radially spaced increment of each of three zones of said formations laterally displaced one from the other and displaced outwardly from the wall of said borehole, including a first zone containing that portion of said conductive fluid which has filtered into said formations from said borehole, a second zone containing naturally occurring formation fluids in substantially their virgin state and a third zone intermediate said first and second zones, the improved method of recording said detected values of said parameter comprising plotting an amplitude-varying, visible trace of said detected values, wherein the ordinate of said trace represents a function of the magnitude of said detected values and the abscissa of said trace represents a function of the lateral distance from the borehole at which each of said detected values were obtained, marking adjacent said trace a numerical value indicative of the depth in said borehole at which said detected values were obtained and plotting below the first said trace at least one additional trace, of the same character as the first said trace, obtained from a different depth in said borehole to produce a plurality of traces having like values of the abscissas thereof vertically aligned from trace to trace.

10. In a method for electrically logging at least one formation in a borehole containing a conductive fluid capable of filtering into earth formations surrounding said borehole wherein an electrical parameter is detected in at least one radially spaced increment of each of three zones of said formation laterally displaced one from the other and displaced outwardly from the wall of said borehole, including a first zone containing that portion of said conductive fluid which has filtered into said formations from said borehole, a second zone containing naturally occurring formation fluids in substantially their virgin state and a third zone intermediate said first and second zones, and such detection is repeated at at least one additional vertically spaced location in the formation of interest, the improved method of recording said detected values of said parameter comprising plotting an amplitude-varying, visible trace of said detected values, wherein the ordinate of said trace represents a function of the magnitude of said detected values and the abscissa of said trace represents a function of the lateral distance from the borehole at which each of said detected values were obtained, marking adjacent said trace an indication of the depth in said borehole at which said detected values were obtained and plotting below the first said trace at least one additional trace, of the same character as the first said trace, obtained from said additional location in said formation of interest to produce a plurality of traces having like values of the abscissas thereof vertically aligned from trace to trace.

11. In apparatus for electrically logging subsurface earth formations surrounding a borehole, at a plurality of vertically spaced locations in said borehole, comprising an electrical logging instrument having means for detecting an electrical parameter in each of a plurality of radially spaced increments of said formations, means for converting said detected parameter to a plurality of electrical signals corresponding in number to the number of said increments in which said parameter is detected, and means for transmitting to the surface of the earth said plurality of signals, the combination with said logging instrument of an improved recording means comprising an elongated, light-sensitive photographic recording medium, means for moving said recording medium parallel to its length as a function of changes in the location of said electrical logging instrument in said borehole, a source of light for projecting a beam of light, first and second adjustable reflection means adapted to reflect and rereflect an image of said beam of light and project said rereflected image on said recording medium, first translating means for adjusting the angle of reflection of said first reflection means in response to the amplitude of each of said signals in a manner such that the position of said image on said recording medium varies along the length of said recording medium in accordance with the amplitudes of said signals, second translating means for adjusting the angle of reflection of said second reflection means in accordance with a function of the radial distance from said borehole of each of said increments from which said signals originated in a manner such that the position of said image on said recording medium varies across said recording medium in accordance with said radial distance, means for interrupting said beam of light following the recordation of the first series of said plurality of signals obtained at one location in said borehole and resuming the projection of said beam of light before the recordation of the next series of said plurality of signals obtained at a different location in said borehole so as to produce a plurality of individual traces, corresponding in number to the number of said locations in said borehole, spaced one below the other along the length of said recording medium.

References Cited in the file of this patent

UNITED STATES PATENTS

| | | |
|---|---|---|
| 2,159,790 | Freystedt et al. | May 23, 1939 |
| 2,393,009 | Chun | Jan. 15, 1946 |
| 2,465,355 | Cook | Mar. 29, 1949 |
| 2,501,791 | Silverman | Mar. 28, 1950 |
| 2,564,861 | Sherborne | Aug. 21, 1951 |
| 2,573,133 | Greer | Oct. 30, 1951 |
| 2,602,836 | Foster | July 8, 1952 |
| 2,629,000 | Olson et al. | Feb. 17, 1953 |
| 2,648,822 | Walter | Aug. 11, 1953 |
| 2,654,064 | Broding | Sept. 29, 1953 |
| 2,754,475 | Norelius | July 10, 1956 |

UNITED STATES PATENT OFFICE
CERTIFICATE OF CORRECTION

Patent No. 2,884,589                                                April 28, 19

William M. Campbell

It is hereby certified that error appears in the printed specificat of the above numbered patent requiring correction and that the said Lett Patent should read as corrected below.

Column 3, line 52, for "resistitvity" read -- resistivity --; colum 4, line 43, for "the tube" read -- and tube --; column 5, line 24, for "switch" read -- switching --; column 6, line 38, for "is this" read -- in this --; line 68, for "$M_3$", second occurrence, read -- $M_4$ --; colum 11, line 64, after "comprising" strike out "a".

Signed and sealed this 7th day of June 1960.

(SEAL)
Attest:

KARL H. AXLINE                                                      ROBERT C. WATSO
Attesting Officer                                              Commissioner of Pate